(12) United States Patent
Tanaka

(10) Patent No.: US 6,329,964 B1
(45) Date of Patent: Dec. 11, 2001

(54) IMAGE DISPLAY DEVICE

(75) Inventor: Seiichi Tanaka, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 567 days.

(21) Appl. No.: 08/757,550

(22) Filed: Nov. 27, 1996

(30) Foreign Application Priority Data

Dec. 4, 1995 (JP) .................................................. 7-315641

(51) Int. Cl.[7] .................................................. G09G 5/00
(52) U.S. Cl. .................................................. 345/8
(58) Field of Search .............................. 345/7, 8, 9, 102; 349/11, 13, 14, 15; 359/632, 13, 630; 340/815.46; 84/464 R

(56) References Cited

U.S. PATENT DOCUMENTS

| | | | |
|---|---|---|---|
| 4,968,117 | * 11/1990 | Chern et al. | 350/162.24 |
| 5,191,319 | * 3/1993 | Kiltz | 84/464 R |
| 5,247,864 | * 9/1993 | Konishi | 84/464 R |
| 5,485,172 | 1/1996 | Sawachika et al. . | |
| 5,497,431 | * 3/1996 | Nakamura | 382/162 |
| 5,557,424 | * 9/1996 | Panizza | 84/464 R |
| 5,598,297 | 1/1997 | Yamanaka et al. . | |

FOREIGN PATENT DOCUMENTS

| | | |
|---|---|---|
| 0640859 | 3/1995 | (EP) . |
| 2266428 | 10/1993 | (GB) . |
| 2295938 | 6/1996 | (GB) . |
| 4106668 | 4/1992 | (JP) . |

OTHER PUBLICATIONS

WPI Abstract Accession No. 95–064823/09, Dec. 13, 1994.

* cited by examiner

*Primary Examiner*—Bipin Shalwala
*Assistant Examiner*—Ricardo Osorio

(57) ABSTRACT

An image display device which presents an enlarged display image with an arranged at its periphery image (referred to as an environmental image) is provided with circumstances-detecting means for detecting the operating conditions of the image display device and image-changing means. The circumstances-detecting means detects the quantity or brightness of light inside or outside the display device or/and the sound volume of the display or surrounding sound outside the display device. The image-changing means varys the light quantity and/or color tone of an environmental image of the display device.

29 Claims, 16 Drawing Sheets

IMAGE DISPLAY DEVICE

BACKGROUND OF THE INVENTION

The present invention relates to an image display device and, more particularly, to a head mounted display using a liquid crystal display with lenses for enlarging an image on a screen thereof.

This display device is used, for example, for viewing television and video programs, enjoining stereo images and virtual reality images, monitoring TV games and computer inputs and so on.

Recently, the head mounted displays (hereinafter referred to as HMD) have become actively studied with development of miniaturized liquid crystal displays (hereinafter referred to as LCD) device. As known, a conventional HMD device comprises a pair of enlarging lenses, a pair of field diaphragms, a pair of LCD and a pair of back lights. All components are mounted in a casing. A user can look at an enlarged image on a screen of the LCD device.

In the HMD device, all periphery of a main display image is covered with a black-colored field diaphragm to show effective display area of the LCD. Consequently, the user looks a floating screen in a black space.

The above-mentioned HMD device, however, may cause following problems:

The first problem is that the display image tires the eyes because the image has a large difference of brightness between its center portion and peripheral portion.

The second problem is that a viewer loses a usual atmosphere to be sensed when viewing a display screen in a room since his eyes is shut off all the surroundings.

To solve the above-mentioned problems, there has been proposed such a HMD device that presents a main liquid-crystal display image surrounded by an environmental image that may cause the user, for example, to feel as if he is viewing a movie on a TV screen in his room. This HMD device can attain the minimized difference of brightness between the LCD image and the environmental image and thereby does not tire the eyes of the user. This device can also offer such merits that the user gets a reference measure for recognizing a relative size of the screen, enjoys (a room atmosphere) and an increased feeling of his presence therein.

However, the HMD device with means for providing an environmental image may be not so effective as supposed because the environmental image can not vary.

For example, the brightness of a display screen image can not always be constant and may vary from time to time. Therefore, a large difference of brightness may be produced between the center portion image and the environmental image unless the brightness of the latter image varies correspondingly. In this instance, the image may tire the eyes, i.e., the first merit can not always be assured.

Furthermore, a user may become blind in a short time with his eyes taxed if brightness of a field-of-vision in the HMD device considerably differs from that of light in a room when of the field-of-vision in the HMD device when the user puts on and off the HMD device in the room.

Unless the environmental image varies as the center display image changes, total expression of the image may become tedious and can not cause the viewer to feel the sense of presence. The device can not realize the merit for increasing the ambient effect.

The ambience and impressiveness of an image are produced mainly by the effect of interactive audiovisual signals. The ambience can be lost when the image display device presents nothing but an environmental image.

Furthermore, it is very difficult for a viewer of the HMD to recognize the external circumstances.

Conventional HMD devices are designed for shutting off the outside vision and noises in order to get the viewer absorbed in the world filled with display screen images and accompanying speech and sound through a head phone. This may cause such a problem that the viewer can not sense what happened with or around him, for example, he is spoken to by somebody or a telephone is ringing.

SUMMARY OF THE INVENTION

The present invention was made to solve the above-mentioned problems and is directed to provide a HMD device which has a further improved merits of the environmental image in reducing tiredness of the eyes and increasing the ambient effect and which allows a user to recognize the surroundings while he takes on the HMD device.

In view of the foregoing, the present invention is first intended to provide an image display device for displaying an enlarged main display image together with an environmental image disposed at periphery of the main image, which is provided with circumstances detecting means for detecting conditions under which a user uses the image display device, for example, the brightness of a liquid crystal display, the brightness of light at a place where the user is, the volume or frequency of sound emitted from a speaker and so on.

Secondly, the present invention is directed to provide an image display device for displaying an enlarged main image together with an environmental image disposed at periphery of the main image, which is provided with image-changing means for varying the environmental image according to circumstances detected by the above-mentioned circumstances detecting means.

Accordingly, an object of the present invention is to provide an image display device as defined above, in which the circumstances-detecting means is used for detecting a quantity or brightness of light of the display device or a quantity or brightness of light around a user and the image-changing means is used for varying a light quantity of the environmental image according to the detected light quantity or brightness.

Another object of the present invention is to provide an image display device as defined above, in which the circumstances-detecting means is used for detecting a sound volume or sound of the display device or a volume of sound or sound around a user and the image-changing means is used for varying a light quantity of the environmental image according to the sound volume or sound.

Another object of the present invention is to provide an image display device as defined above, in which the circumstances-detecting means is used for detecting a quantity or brightness of light of the display device or a quantity or brightness of light around a user and the image-changing means is used for varying a color-tone of the environmental image according to the light quantity or brightness.

Another object of the present invention is to provide an image display device as defined above, in which the circumstances-detecting means is used for detecting a sound volume or sound of the display device or a volume of sound or sound around a user and the image-changing means is used for varying a color-tone of the environmental image according to the sound volume or sound.

Namely, the image display device according to the present invention can detect a change in the brightness or light quantity or color tone of an image displayed on a screen of the LCD or a change in the volume or frequency of accompanying sound or a change of the state surrounding a user who is viewing the display image and can reflect any detected change to the brightness, light quantity (intensity) and color tone of an environmental image surrounding the image on the LCD screen.

These features of the image display device can reduce a difference of brightness or light quantity between the main image and the environmental image or a difference of brightness or light quantity of the field-of-vision in the HMD from the brightness of external light around the user to the extent not to tire the eyes of the user, which has not been realized by conventional devices, especially HMD device.

Furthermore, the image display device according to the present invention can vary the brightness of the environmental image in synchronism with a change of an image and accompanying sound of the LCD display, enabling the viewer to enjoy the image with much enhanced impression as compared with that of any conventional, particularly, HMD device.

Thirdly, the present invention is directed to provide an image display device for displaying an enlarged main display image together with an environmental image disposed at periphery of the main image, which is provided with environmental sound presenting means for giving an environmental sound suitable for the environmental image.

Accordingly, an object of the present invention is to provide an image display device as defined above, in which the environmental sound presenting means is used for outputting a synthesized sound by combining an accompanying sound of the display image with an environmental sound.

Another object of the present invention is to provide an image display device as defined above, in which the environmental sound presenting means is used for separately outputting an accompanying sound of the display image and an environmental sound.

Another object of the present invention is to provide an image display device as defined above, in which the environmental sound presenting means is used for detecting presence or absence of an accompanying sound of the display image and selectively outputting the accompanying sound or the environmental sound.

Namely, the image display device according to the present invention can give an audiovisual expression with an enhanced audiovisual interactive effect, which could not obtain by any conventional HMD type image display device. It also allows a user to enjoy a speech accompanying the display while the speech is presented and to enjoy an environmental sound while the accompanying speech is absent. This feature enables the user to enjoy the display with accompanying speech without being interfered by the environmental sound.

Fourthly, the present invention is directed to provide an image display device for displaying an enlarged main display image together with an environmental image disposed at periphery of the main image, which is provided with environmental sound presenting means for detecting an accompanying sound of the display image or a surrounding sound around a user, selecting and outputting a specified sound together an environmental sound.

This display image device enables a user to hear, as an environmental sound, a specified external sound that helps him in recognizing the surroundings.

PREFERRED EMBODIMENT OF THE INVENTION

Figure 1:
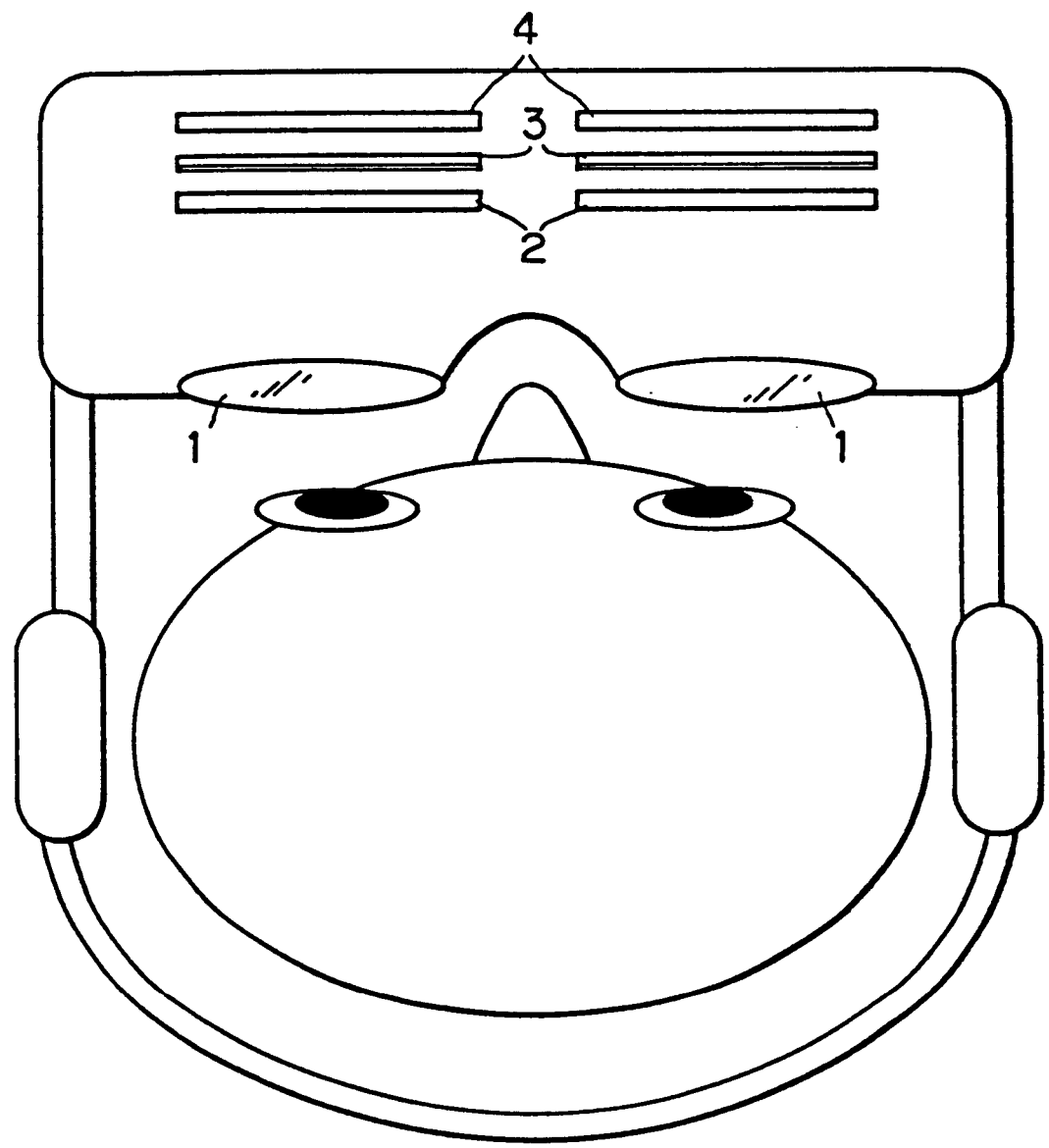
FIG. 1 is a schematic construction view of a conventional head-mounted display.

FIG. 1 is illustrative of an exemplified conventional HMD device which comprises a pair of enlarging lenses 1, a pair of field diaphragms 2, a pair of liquid crystal displays (LCD) 3 and a pair of back lights 4. All components are mounted in a casing. A user can look at an enlarged image on a screen of the LCD device.

Figure 2:
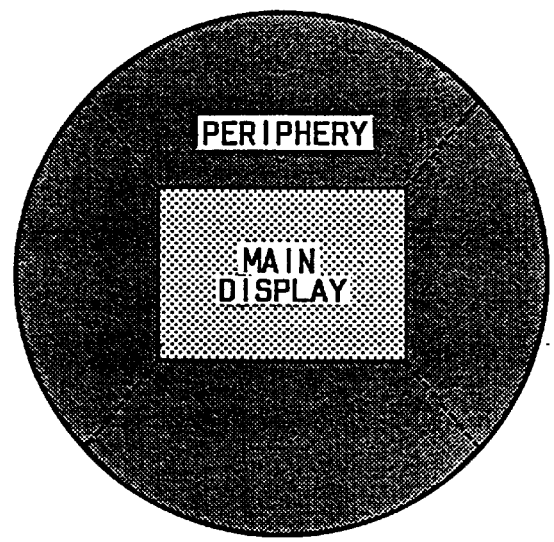
FIG. 2 illustrates a field-of-vision of an observer who is viewing a liquid crystal display image through a conventional head-mounted display.

In the HMD device, all periphery of a main display image is covered with a black-colored field diaphragm to show effective display area of the LCD. Consequently, the user looks a floating screen in a black space as shown in FIG. 2.

Figure 3:
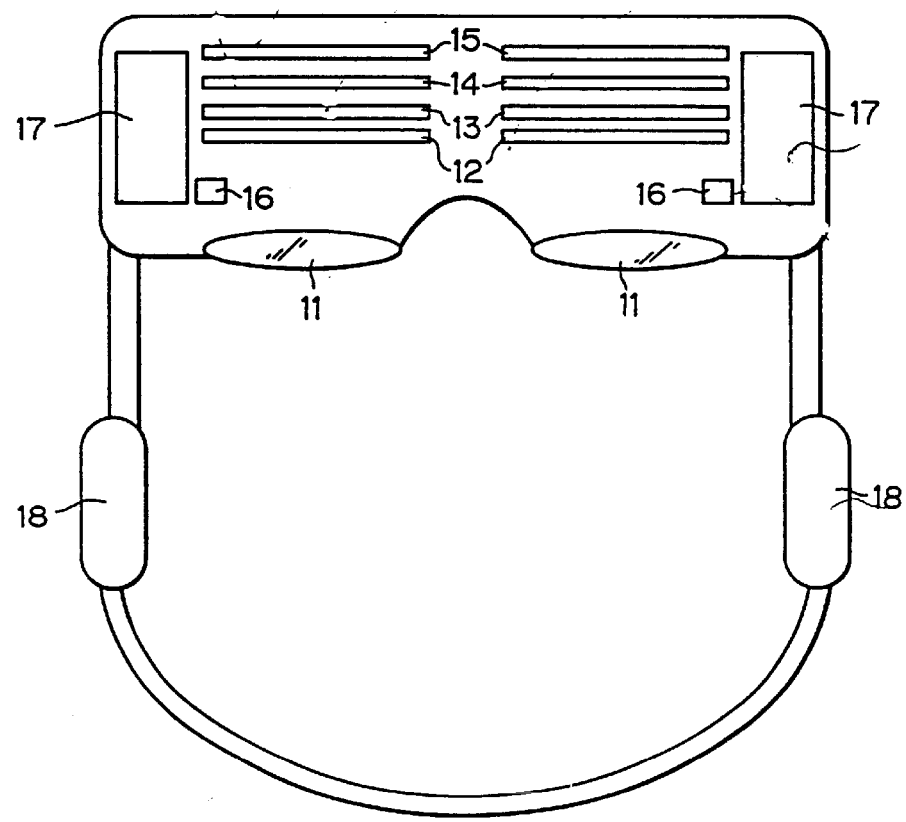
FIG. 3 is a schematic construction view of a head-mounted display device embodying the present invention.

FIG. 3 is illustrative of an image display device according to the present invention, which is applied to a head-mounted display (HMD) used for displaying an image of virtual reality.

As shown in FIG. 3, this embodiment comprises a pair of enlarging lenses 11, a pair of environmental image slides 12, a pair of back lights 13 for an environmental image, a pair of liquid crystal displays (LCD) 14, a pair of LCD back lights 15, a pair of light quantity sensors 16, a pair of light quantity changing devices 17 and a head-phone speaker set 18.

Figure 4:
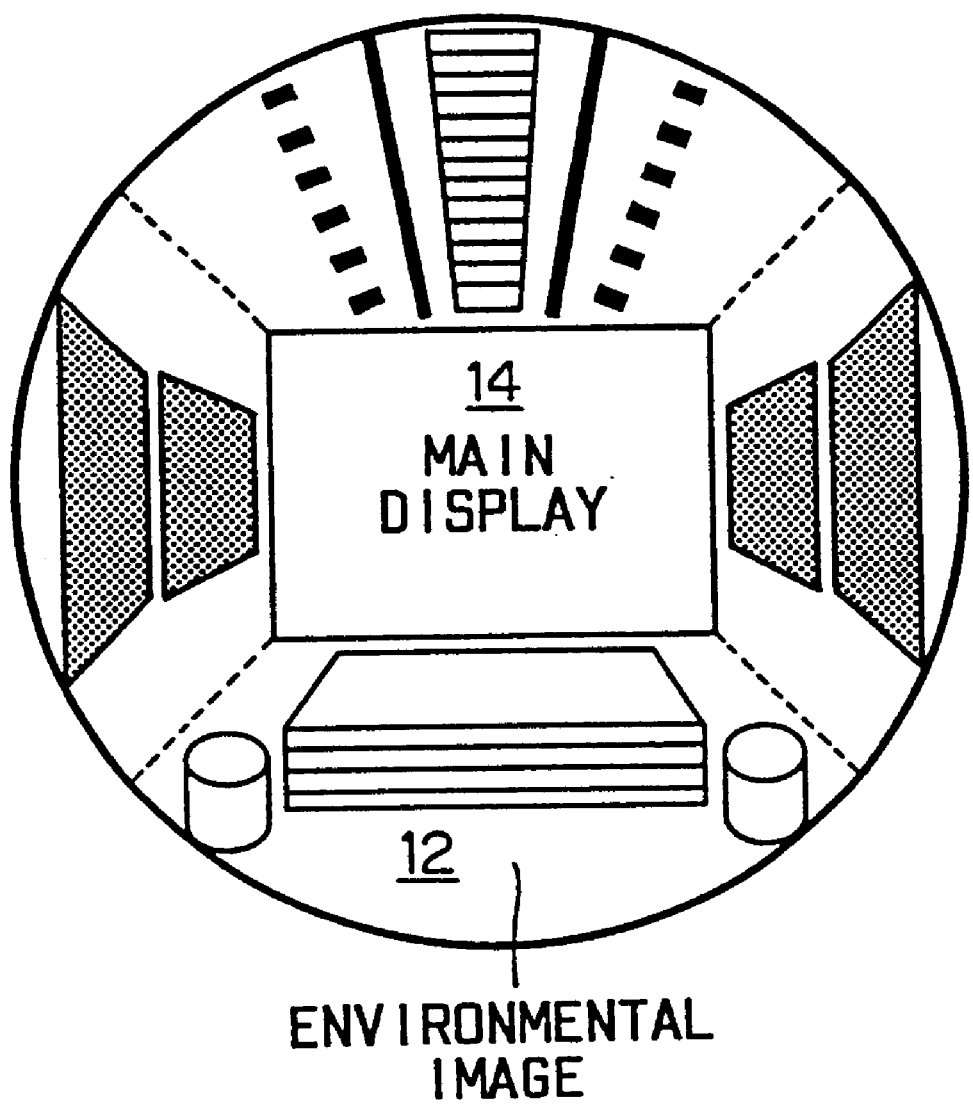
FIG. 4 illustrates a field-of-vision of an observer who is viewing a liquid crystal display image through a head-mounted display having an environmental image.

FIG. 4 illustrates a field-of-vision of a user who is viewing an image on the LCD screen in the HMD device shown in FIG. 3. A main (LCD) image is seen at the center portion in the field and an environmental slide image (room image) is seen at the periphery of the center portion image. As shown in FIG. 3, the Light quantity sensors 16 are disposed outside the field-of-vision of the enlarging lenses 11 and do not obstruct the view. As described before for the conventional display device, the environmental image surrounding the main image allows the viewer to perceive the main image as if he was viewing it in his own room.

Figure 5:
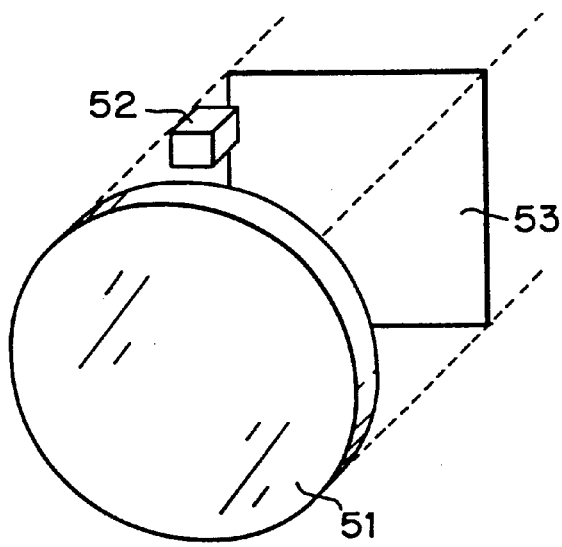
FIG. 5 is a partial enlarged view showing an exemplified structure of circumstances-detecting means used in a HMD device according the present invention.

FIG. 5 is an enlarged view of circumstances-detecting means which is a featured portion of the present invention. In FIG. 5, numeral 51 designates an enlarging lens, and numeral 52 designates a light quantity sensor and numeral 53 designates a display device containing a liquid crystal display and an environmental image slide.

Figure 6:
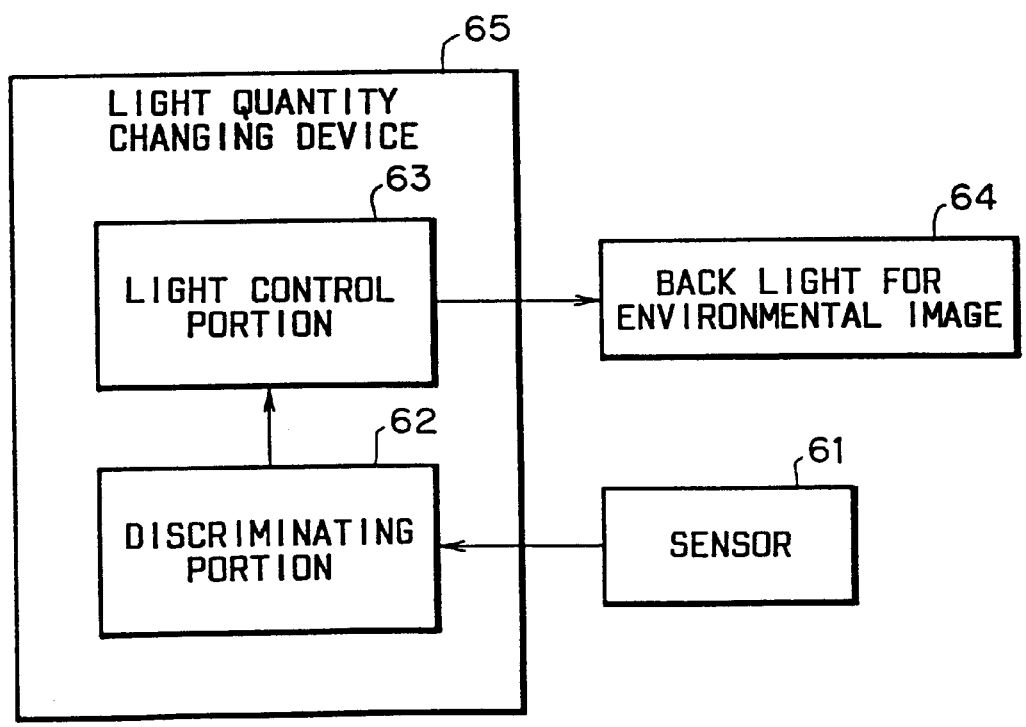
FIG. 6 is a functional block diagram showing a light quantity changing device which is an image-varying device used in a HMD device according to the present invention.

FIG. 6 is a functional block diagram of a light quantity changing device which serves as image-varying means. In FIG. 6, the light quantity changing device 65 comprises a discriminating portion 62 for deciding the need to increase or decrease the current quantity of light of an environmental image by comparing LCD brightness data from a sensor 61 (circumstances detecting means) with the current light quantity of a LCD back light 64 and a light control portion 63 for adjusting the quantity of light from the back light of the environmental image according to the requirement of the discriminating portion 62.

Figure 7:
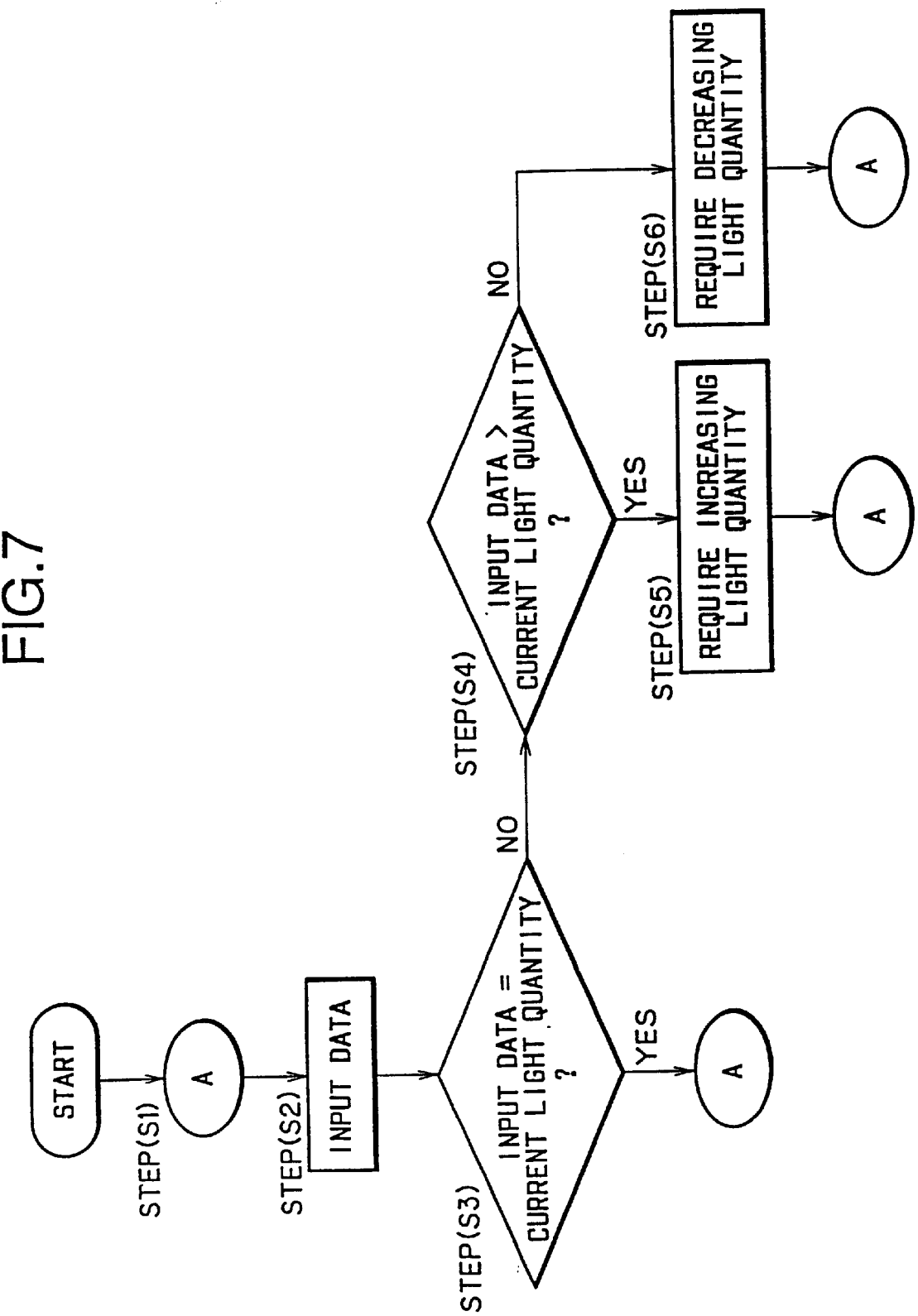
FIG. 7 is a flow chart describing a sequence of control operations of a discriminating portion of a light quantity changing device used in a HMD device according to the present invention.

FIG. 7 is a flow chart showing steps of control operation of the discriminating portion 62 shown in FIG. 6.

At Step (S2), brightness data and light quantity data of an LCD screen image are inputted from the sensor 61. At Step (S3), the input light quantity data is compared with the current data on light quantity of the environmental image back light to check whether both data matches or not. If they are equal to each other, nothing is made and the process returns to Step (S1). If the input data differs from that of the environmental image, Step (S4) determines that the main image light quantity is larger or smaller than that of the environmental image back light. Step (S5) is selected to request the light control portion to increase the light quantity of the environmental image if the brightness of the main image is higher than that of the environmental image, whereas Step (S6) is selected to request the light control portion to decrease the light quantity of the environmental image if the brightness of the main image is lower than that of the environmental image.

As described above, the discriminating portion 62 of the light quantity changing device 65 determines a light quantity of the back light for the environmental image on the basis of the light quantity data received from the sensor 61 and transfers the determined data to the light control portion 63 in order to control the light quantity of the environmental image back light 64. This can eliminate the difference between a main image and an environmental image not to tire the eyes of the user.

By changing arrangement of the environment detecting means it is also possible to provide another display which can detect another different environment. A head-mounted display shown in FIG. 8 differs from the device of FIG. 3 only by arrangement of paired light quantity sensors 81 which in this instance are used for measuring the quantity of light outside the display casing. This HMD device can control the light quantity of an environmental image according to the brightness of the external light by processing light quantity data obtained by the sensors 81 in the same manner as shown in FIGS. 6 and 7.

Figure 8:
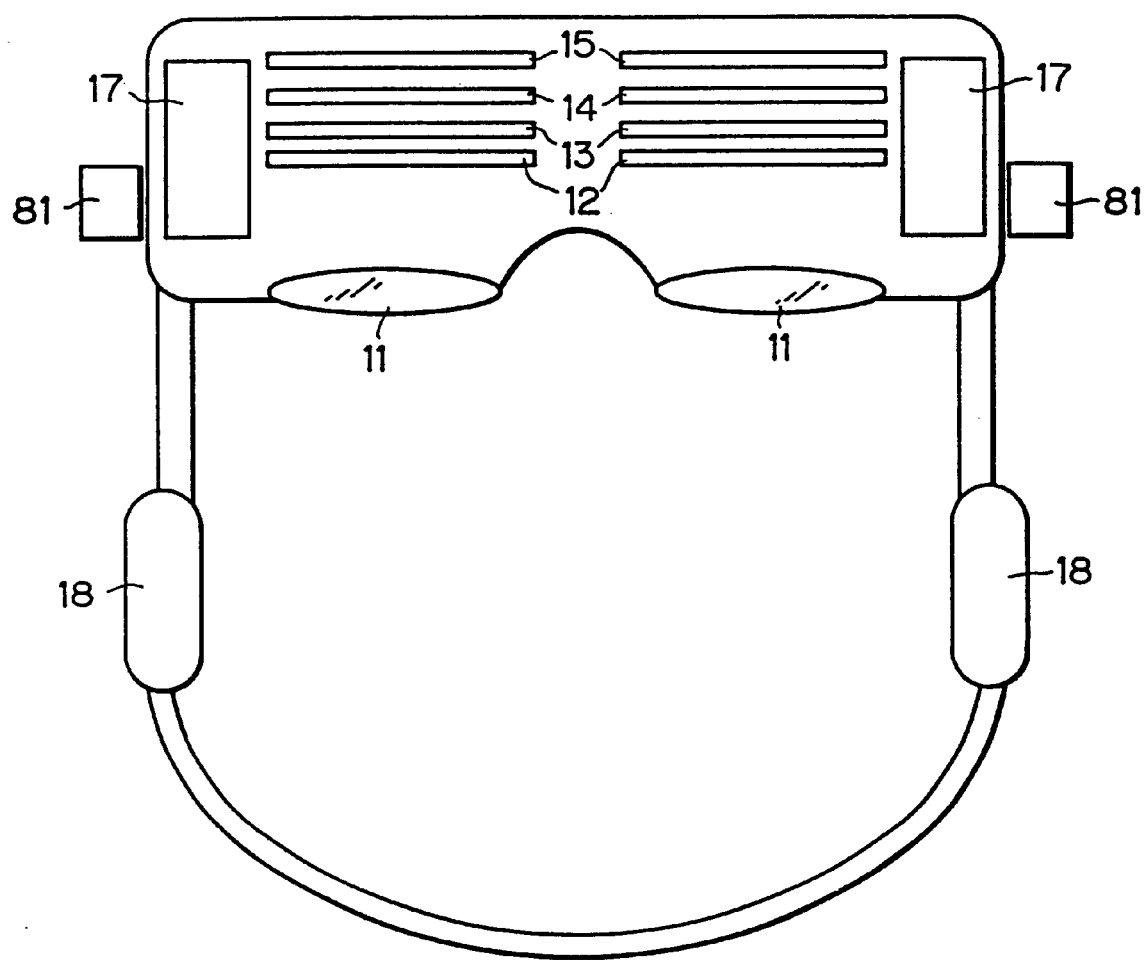
FIG. 8 is a schematic construction view of a head-mounted display provided with a light quantity sensor for measuring surrounding light quantity according to the present invention.

The device of FIG. 8 is similar in structure to the device of FIG. 3 and differs from the latter by the arrangement and purpose of its sensors 81. Namely, the HMD device of FIG. 8 is provided with light detecting means 81 for detecting the brightness of light around the user and can control an environmental image surrounding a main image (LCD) according to the brightness of external light to allow the user to enjoy video in HMD with an environmental image whose brightness is the same as that of external light, e.g., with a dark environment when user sits in a dark room.

Furthermore, the user, just after taking off the HMD device, can take a changed view with brightness similar to that of the environmental image, so his eyes may not be tired with an excessive change in visual perception. While the user observes main moving frames in the HMD device, he can also sense the brightness of external light from the light quantity of an environmental image surrounding the main image. This enables the user to recognize a change of the external conditions to some extent. For example, when somebody came into a dark room and lighted up the room, the user may sense it without taking off the HMD device. Namely, the HMD device according to the present invention enables the user to sense the circumstances to some extent through a change in the light quantity of an environmental image surrounding a main image that he is viewing.

Another embodiment of the circumstances detecting means will be described as follows:

A sensor for detecting a volume of sound outputted from a speaker (e.g., for detecting the volume of sound emitted together with a moving picture of a TV program or TV game) may be used as circumstances detecting means for changing the light quantity of an environmental image surrounding a main image in a HMD device as the output volume of the speaker varies.

Figure 9:
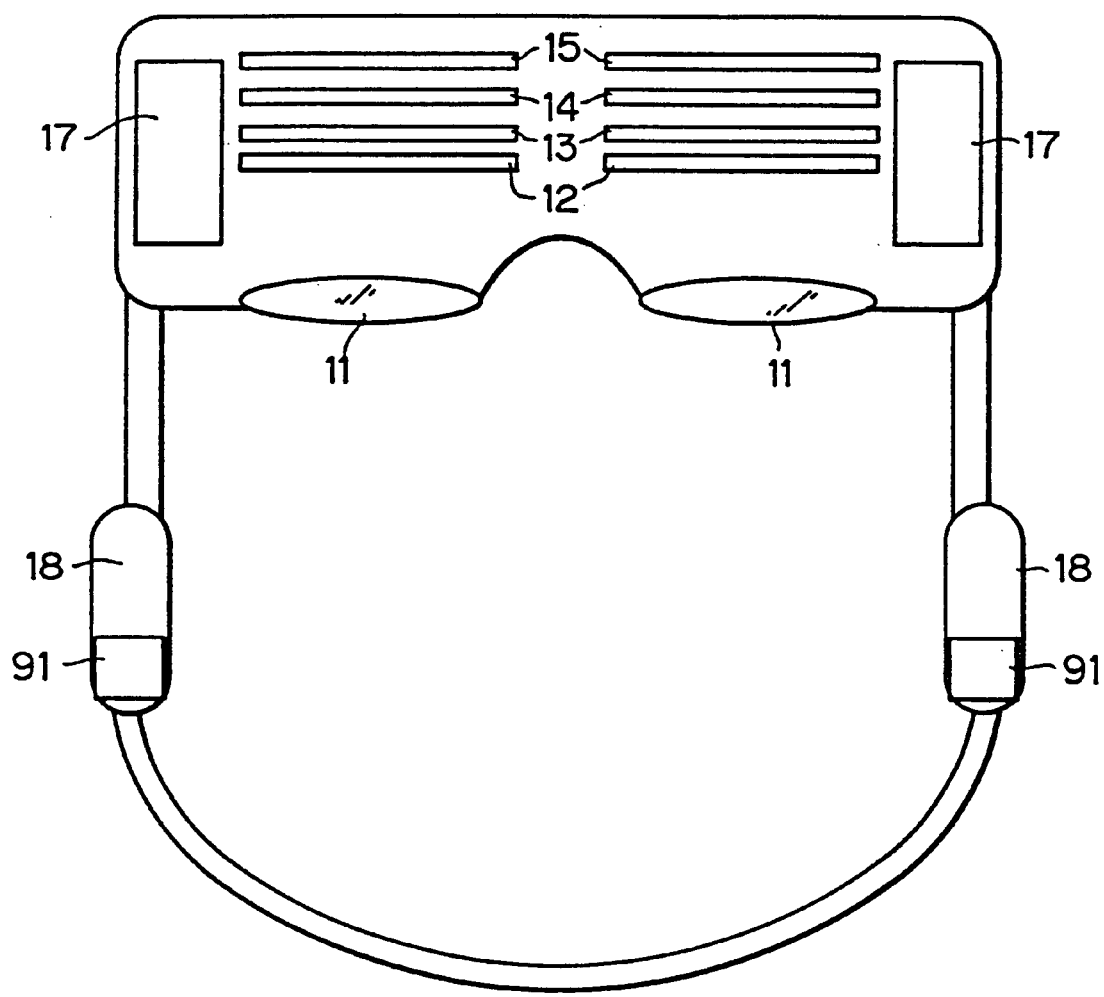
FIG. 9 is a schematic construction view of a head-mounted display provided with a sound volume measuring device for measuring sound volume according to the present invention.

Paired sound sensors 91 for measuring a sound volume of a speaker are disposed as shown in FIG. 9 and data measured by the sensors 91 is processed through the light quantity changing device shown in FIG. 6. Each sound sensor 91 measures the intensity of a sound signal and converts it into numerical data by D/A conversion. The device of FIG. 9 differs from the device of FIG. 3 only by the purpose and arrangement of its sound-sensors 91. Other components are substantially identical to those shown in FIG. 3.

Figure 10:
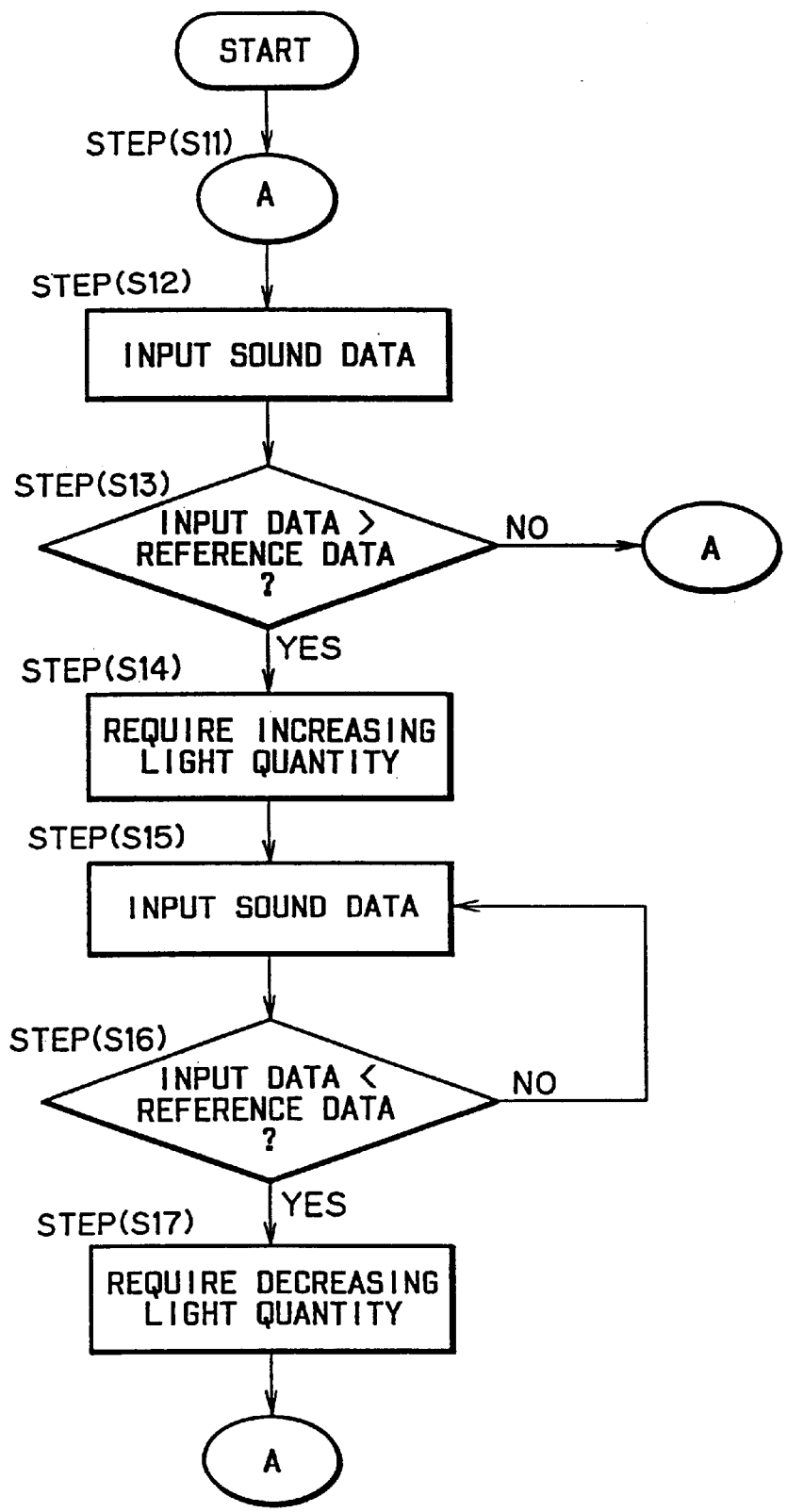
FIG. 10 is a flow chart describing a sequence of control operations of a discriminating portion of the sound volume measuring device according to the present invention.

FIG. 10 is a flow chart describing steps of control operation of a discriminating portion that is provided with sound sensors 91 as circumstances detecting means. At Step (S12), sound-volume data from each sound sensor 91 is inputted into the discriminating portion. At Step (S13), the discriminating portion determines whether the received sound-volume data is larger or smaller than a preset reference value (a certain threshold). The process returns to Step (S11) if the sound-volume is smaller than the preset value. When the sound-volume being larger than the preset value, the process advances to Step (S14) at which a command, e.g., for increasing the light quantity of an environmental image, is given to a light control portion.

At Step (S15), sound-volume data from the sound sensor 91 is inputted into the discriminating portion. At Step (S16), the discriminating portion determines whether the received sound-volume data is larger or smaller than a preset reference value (a certain threshold). The process returns to Step (S15) if the sound-volume is larger than the preset value. With the sound-volume being smaller than the preset value, the process advances to Step (S17) at which a command for decrease the light quantity of an environmental image is given to a light control portion.

As described above, the sound-volume measuring device (a pair of sensors) detects the volume of a sound emitted from a display device and transfers the measured data to a light quantity changing device. The light quantity changing device determines the light quantity of a back light for illuminating an environmental image and requests the light control portion to control the light quantity of the back light. Since a sound signal from the speaker is synchronized with a main image of the LCD, an environmental image varies in synchronism with the main image. Accordingly, the HMD device with the described sound sensors can present an impressive audiovisual expression by varying a main display image together with an environmental image as the output sound of the speaker varies.

Another embodiment of the sound-volume measuring device used as circumstances-detecting means will be described as follows:

While the before-described sound-sensor measures the volume of sound, the present embodiment divides the sound signal frequency into components, detects only a specified frequency sound and transfers the selected sound data. By using this feature, it is possible to increase the impression of an image, e.g., of an explosion scene on an LCD screen with an emphasized low-frequency sound with varying brightness of the environmental image. The embodiment can also give video frames with such a joyful effect varying an environmental image only with a human voice by measuring the frequency components of human voice and transferring said data to the sound control portion.

The sound-volume measuring device can be, of course, set to detect the amount of sound around a user of the LCD type HMD in order to vary the light quantity of an environmental image with a change in amount of the surrounding sound. In this instance, a user who is viewing the HMD with this feature can recognize a change in brightness of the environmental image, that indicates a change of surroundings, for example, somebody is speaking to him or a telephone is ringing.

It is further possible to finely vary the environmental image as a main image (LCD) and circumstances change by using a plurality of circumstances-detecting means. An example is a HMD that is provided with a display sound-volume measuring device and a light quantity detecting device for detecting the brightness of external light and varies the brightness of the environmental image according to the data obtained by using these two different kinds of sensors. This embodiment is shown in FIG. 11.

Figure 11:
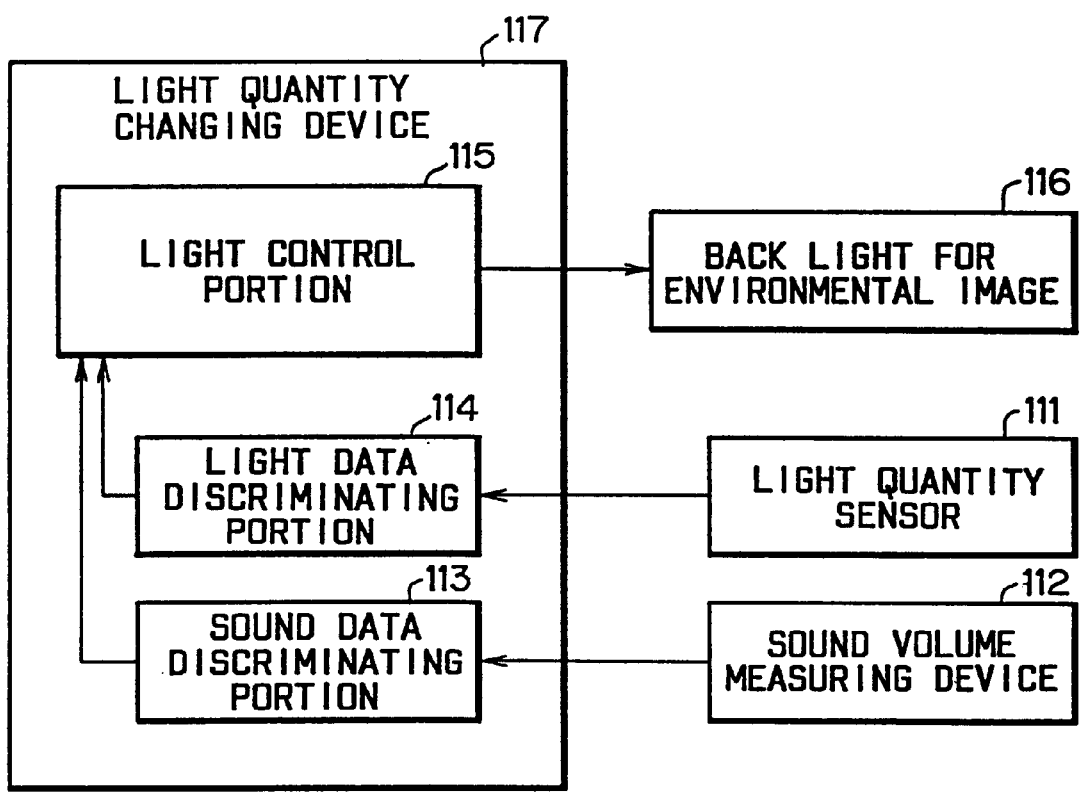
FIG. 11 is a functional block diagram of an embodiment of the present invention, which is provided with a plurality of the circumstance detecting means.

In FIG. 11, a light-data discriminating portion 114 determines the quantity of light to be emitted from a back light for an environmental image depending upon light quantity data from a light quantity sensor 111 for detecting the brightness of the external light and a sound-data discriminating portion 113 determines the quantity of light to be emitted from a back light for an environmental image depending upon sound-volume data from a sound volume measuring device 112 for detecting the sound volume of a display speaker. Both the discriminating portions, respectively, request a light control portion 115 to increase or decrease light quantity of the environmental image 116.

Figure 12A:
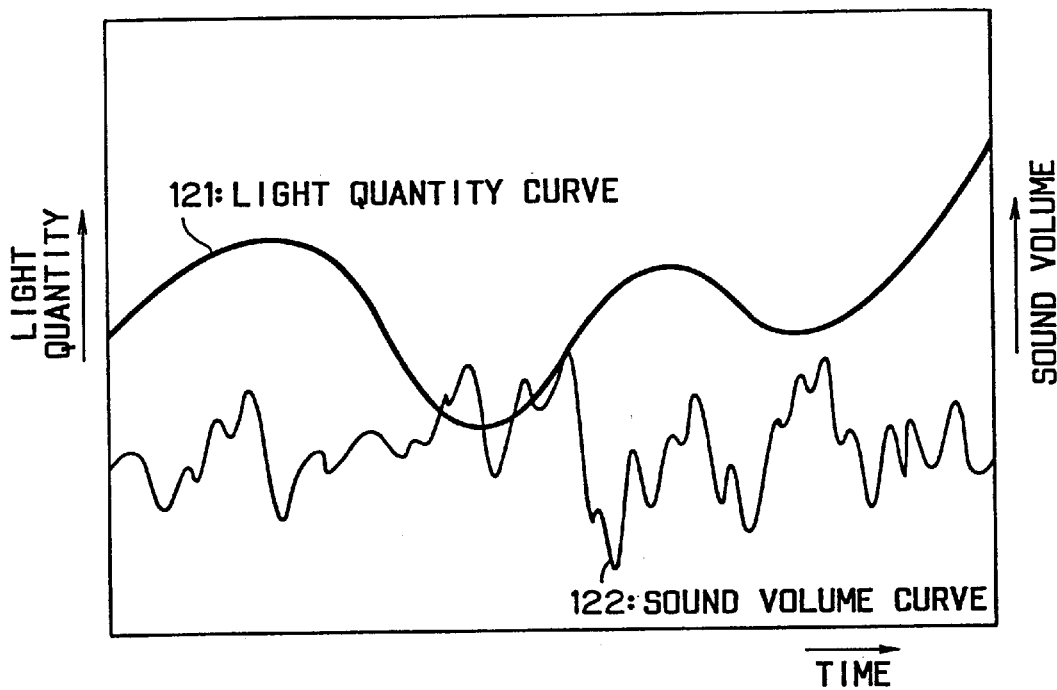
FIG. 12A shows curves of time-based change of light quantity data and sound volume data respectively.
Figure 12B:
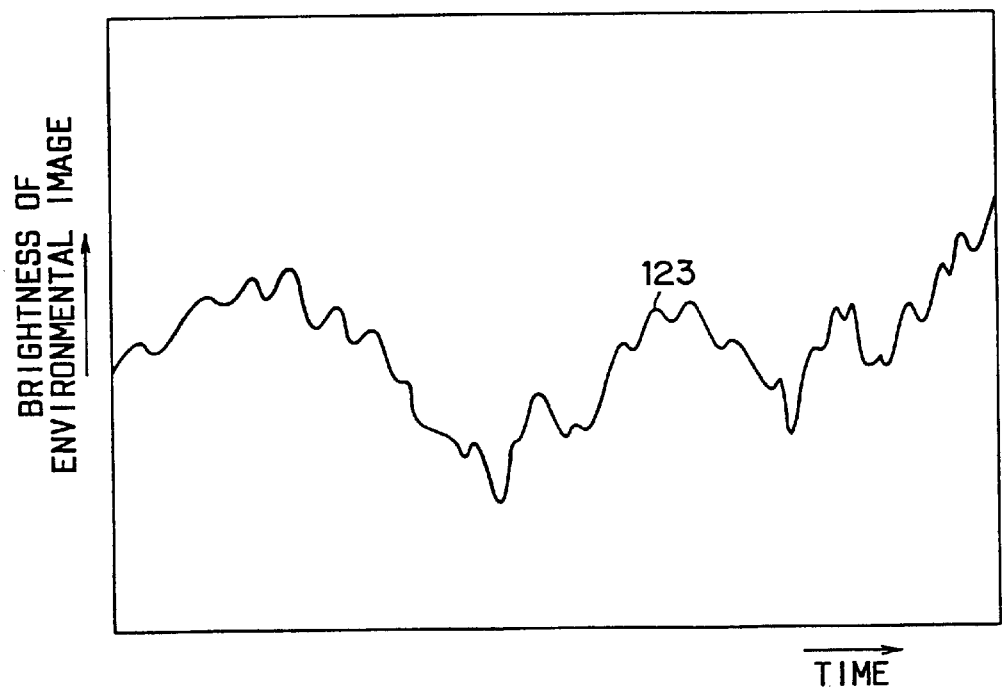
FIG. 12B shows a curve of time-based change of the light quantity of an environmental image.

The light quantity data and the sound-volume data can be represented by time-based curves 121 and 122 respectively as shown in FIG. 12A. On the basis of the data (FIG. 12A), the light quantity control portion 115 of the light quantity changing device 117 controls the quantity of light emitted from the back-light for the environmental image so that the light quantity 123 may vary as shown in FIG. 12B, i.e., the brightness of the environmental image may conform with the light quantity data and the sound-volume data. A HMD with this device can reproduce a main image surrounded by an environmental image which brightness varies according to the brightness of external light and the sound volume of the display. Namely, the main image may give an increased effect of presence and may reduce tiredness of the user's eyes.

Figure 13:
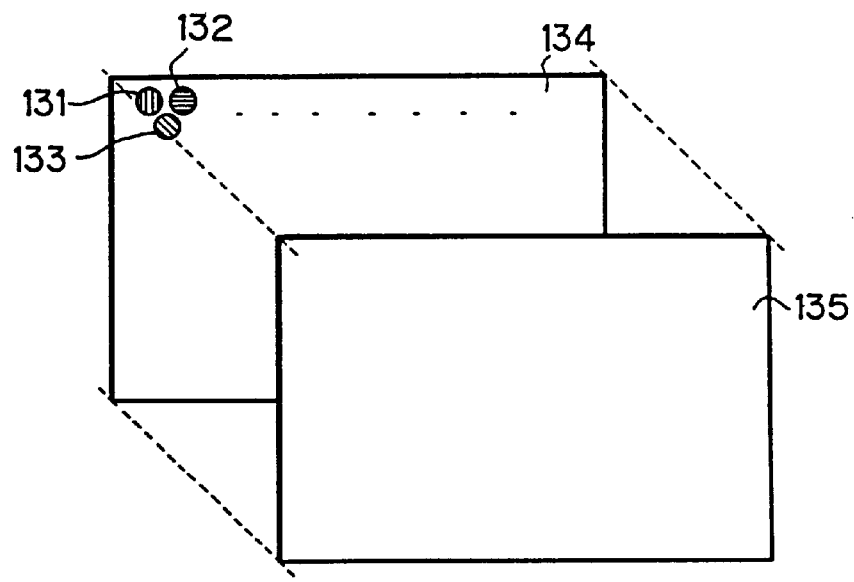
FIG. 13 is a partial enlarged view of an exemplified structure of image-varying means according to the present invention.

Another image-varying device is described as follows:

Referring to FIG. 13, the image-varying device is provided with a light-color varying unit that contains a number of sets of light emitting diodes (LED): each set consists of three LEDs emitting red light, blue light and green light respectively and being arranged to form a delta, and said sets of LEDs being are disposed in rows and columns (hereinafter referred to as arrays of LED sets). In FIG. 13, numerals 131, 132 and 133 designate a red LED, a blue LED and a green LED respectively, numeral 134 designates a whole system of LED arrays and numeral 135 designates a slide for an environmental image. By separately controlling three kinds of color LEDs it is possible to vary the color-tone of a whole color-image.

Figure 14:
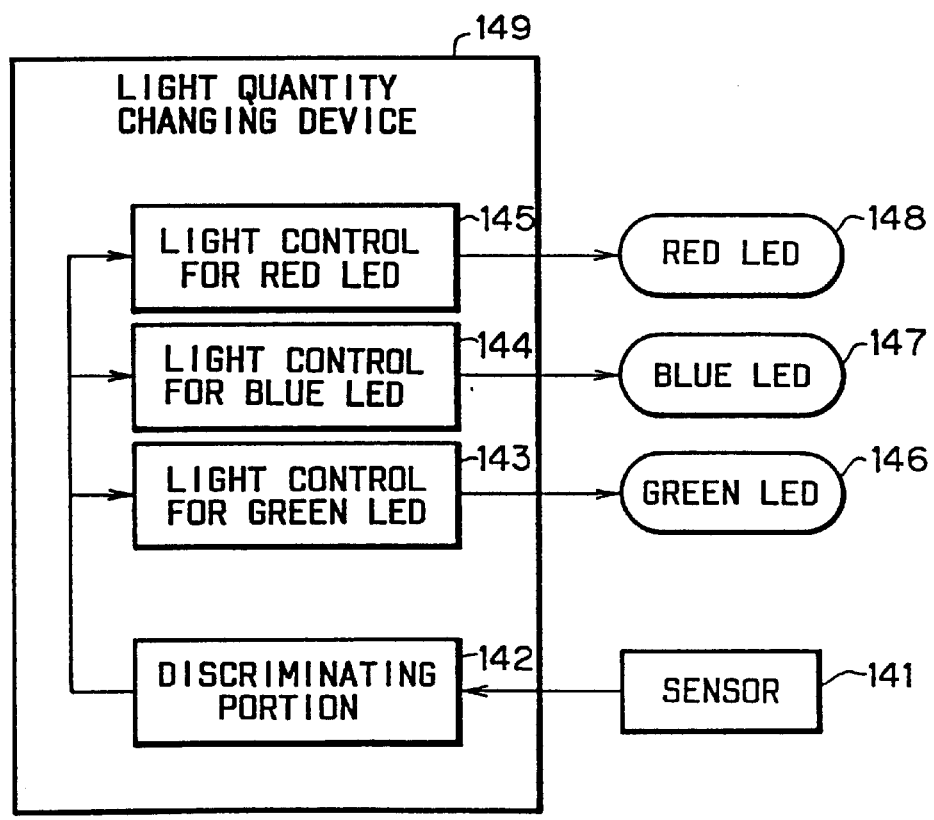
FIG. 14 is a functional block diagram of a light-color changing device which serves as image changing means according to the present invention.

FIG. 14 is a functional block diagram of the light quantity changing device 149 which comprises a discriminating portion 142 for discriminating data from a color-tone sensor 141 and determining the light-tone of each back light and three separate color-tone control portions 143 (for green color-tone), 144 (for blue color-tone) and 145 (for red color-tone) for generating control signals to adjust the quantities of light emitted from the green LEDs 146, blue LEDs 147 and red LEDs 148. The above-mentioned construction of the device may be modified by using a three-color electroluminescence (EL) panel in place of the LED arrays.

Figure 15:
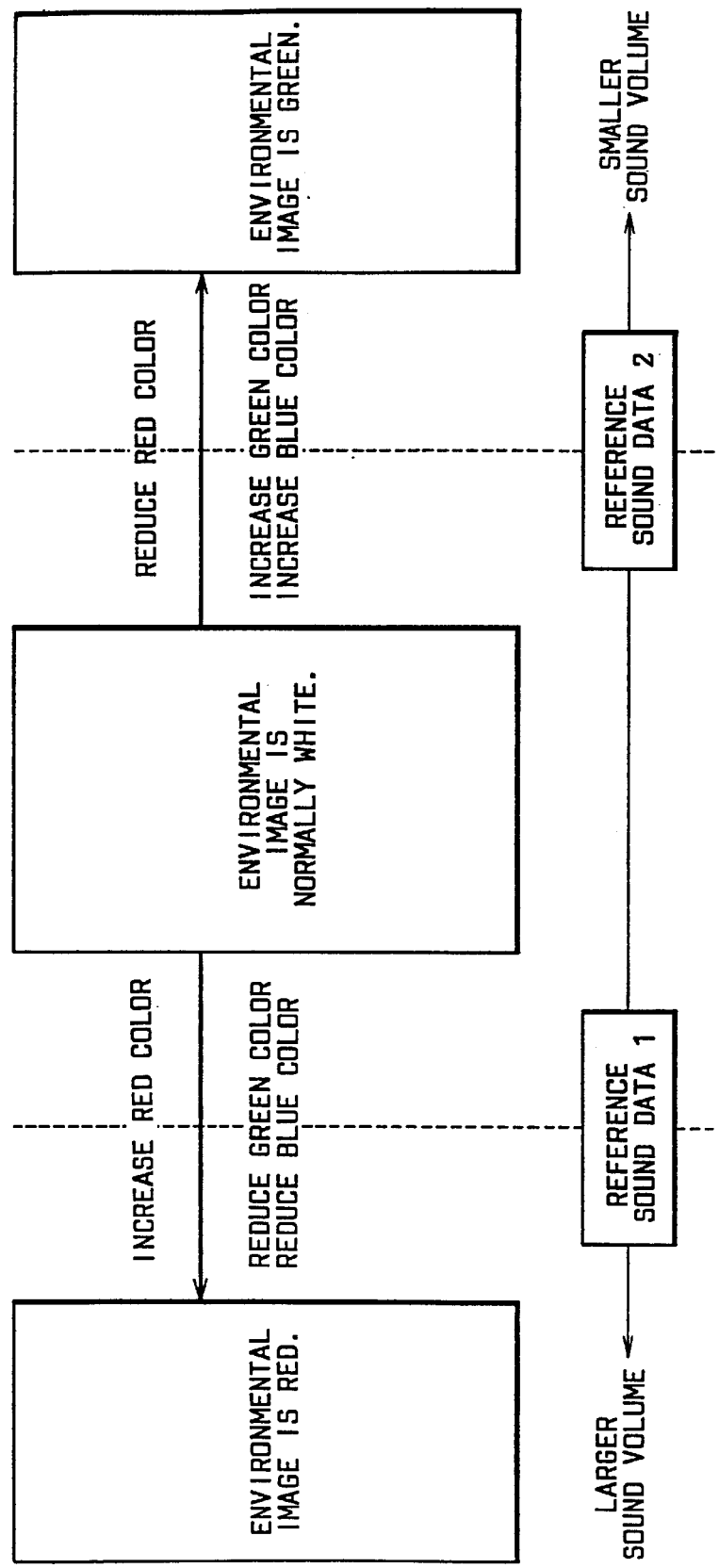
FIG. 15 depicts an example of control operations of a discriminating portion of the light-color changing device according to the present invention.

FIG. 15 depicts an example of control operations of the discriminating portion 142 shown in FIG. 14. The discriminating portion holds preset sound-reference data (threshold) 1 and sound-reference data (threshold) 2, compares the input data from each sensor with the reference data and controls the light color of an environmental image according to a comparison result. The environmental image may be adjusted, for example, to be reddish when sound data received from a sound-volume measuring device is lager than the sound-reference data 1 and to be greenish when sound data received from a sound-volume measuring device is smaller than the sound-reference data 2. Such settings can be made optionally by a user. The number of the reference settings can be increased to produce many variations of color light according to input data.

With the above-mentioned HMD device that is capable of presenting the main image with an environmental image varying depending upon the circumstances, the user can enjoy an impressive audiovisual program that does not tax his eyes.

Figure 16:
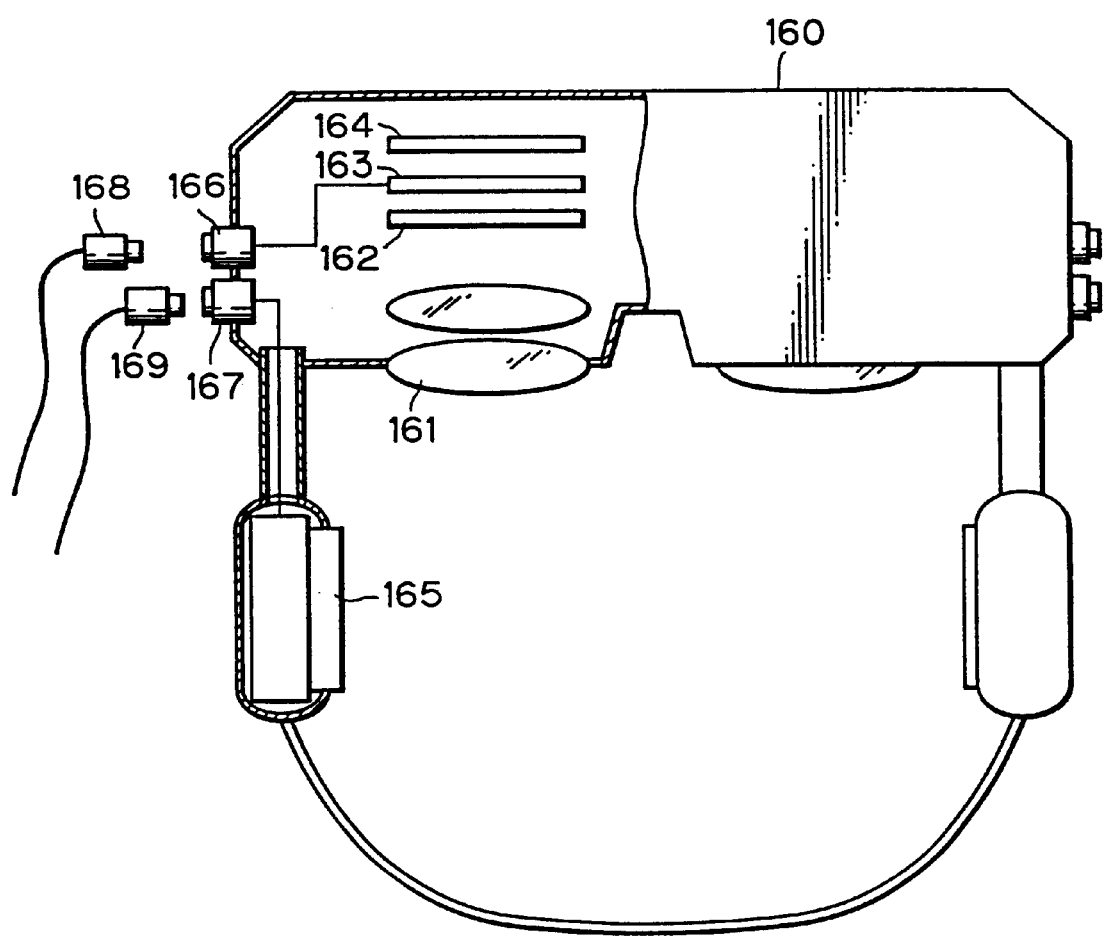
FIG. 16 is a schematic construction view of another HMD device embodying the present invention.
Figures 17A, 17B, 17C:
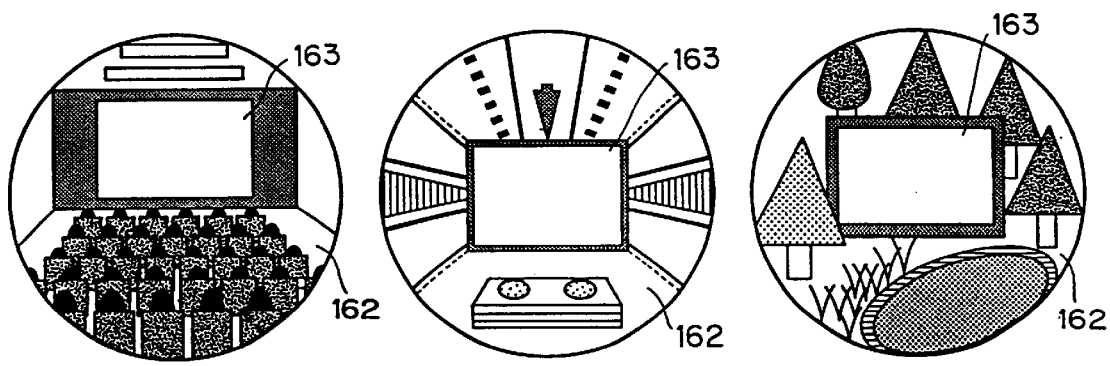
FIGS. 17A to 17C illustrate fields-of-vision of an observer who is viewing a liquid crystal display image through a HMD device according to the present invention.
Figure 18:
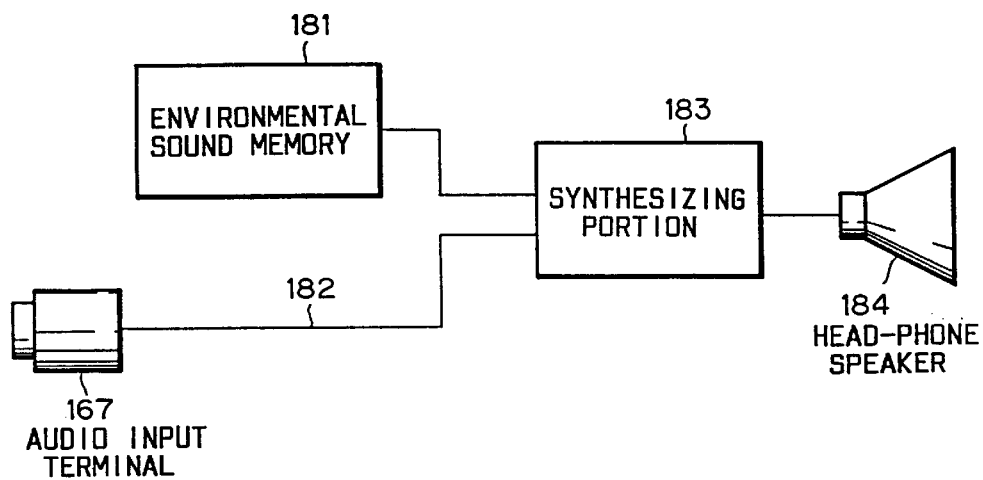
FIG. 18 is a block diagram of an exemplified structure of environmental sound presenting means used in another HMD device embodying the present invention.

Referring to FIGS. 16 to 18, a HMD device embodying the present invention is described as follows:

In FIG. 16, there is shown a HMD device which has a lens casing 160 accommodating an enlarging optical lens system 161, an environmental image 162, a liquid crystal display (LCD) 163, a back light 164 for the LCD 163, environmental sound presenting means 165, a video input terminal 166, and an audio input terminal 167. A video-signal and an audio-signal are inputted into the HMD device through the video input terminal 168 and audio input terminal 169 respectively.

FIGS. 17A to 17C illustrate fields-of-vision of a user who is viewing an LCD screen image 163 with an environmental image 162 which makes the user feel as if he was viewing a movie in a movie-theater (FIG. 17A), playing a TV game in a spaceship (FIG. 17B) and enjoying a TV program in a forest (FIG. 17C).

FIG. 18 is a block diagram showing an exemplified structure of the environmental sound presenting means which is a featured portion of the present invention.

In FIG. 18, numeral 181 designates an environmental sound memory portion for storing various kinds of environmental sound signals, numeral 182 designates an audio signal inputted in the LCD 163 through the audio-input terminal 167, numeral 183 designates a synthesizing portion for mixing an environmental sound with a display sound, and numeral 184 designates a head-phone speaker.

The environmental sound memory portion 181 consisting of, e.g., IC-cards or micro-tape memories for recording therein environmental sound signals suited to respective kinds of environmental images 162. For example, the bustle for the environmental image of the inside of the movie theater (FIG. 17A), an engine noise and whistle for the environmental image of the spaceship inside (FIG. 17B) and bird's twitterings for the environmental image of the forest (FIG. 17C) are recorded therein. As soon as the HMD is turned on, the environmental sound memory portion 181 starts sending an audio signal to the synthesizing portion 183 and then repeats sending the recorded environmental sound until the HMD is switched off.

The synthesizing portion 183 synthesizes the audio signal received from the environmental sound memory portion 181 with an audio signal of the LCD 163 and transfers a synthesized audio-signal to the head-phone speaker 184. In this instance, the synthesis can be done, e.g., under the following conditions:

The intensity of the environmental sound: 20 dB

The intensity of the LCD display sound: 70 dB

The frequency band of the environmental audio-signal is higher than 700 Hz.

It is well known that the human's hearing sense can not sense one of coexisting audio signals by the masking effect of the other. This masking effect is featured in that an audio signal having a high frequency and a small intensity is masked (not to be audible) by an audio signal having a low frequency and a large intensity. Therefore, the synthesized audio signal from the synthesizing portion 183 can be sensed by the user in such a way that the environmental sound is masked not to be audible when the sound of the LCD 163 presents and it becomes audible only in the absence of the LCD sound. The aforementioned intensity settings of audio-signals are given by way of example and do not define the limits. It is, of course, possible to apply any other settings as far as the environmental sound can be masked by the LCD sound.

As described above, the shown embodiment can present the user an environmental image together with an environmental sound in the absence of a display image and sound related to the LCD 163 to enable the user to feel his presence at the place represented by the environmental image. When a video-signal 168 and an audio signal 169 related to the LCD 163 are inputted, the environmental sound becomes inaudible to the user by the masking effect. The user can enjoy the LCD screen image with the accompanying sound. The environmental sound is also audible while the audio-signal disappears at the time of changing-over the display image, e.g., the current TV channel to another TV channel. This enables the user to maintain his presence in the environmental image.

Figure 19:
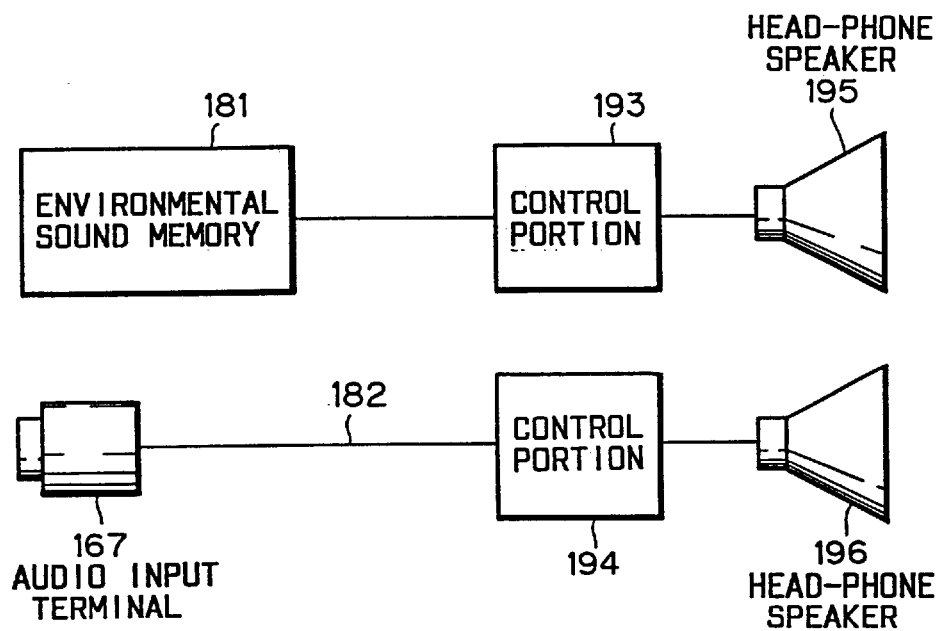
FIG. 19 is a block diagram of another exemplified structure of environmental sound presenting means used in a HMD device according to the present invention.

Although the described embodiment has a pair of head-phone speakers for the right and left ears, it can be modified, as shown in FIG. 19, to have a pair of head-phone speakers 195 for environmental sound, a pair of head-phone speakers 196 for LCD sound and control portions 193 and 194 for regulating intensity settings of and the environmental sound the LCD sound, omitting the synthesizing portion 183 shown in FIG. 18. This modification is free from the deterioration of sound, which may be caused in the synthesizing portion.

Figure 20:
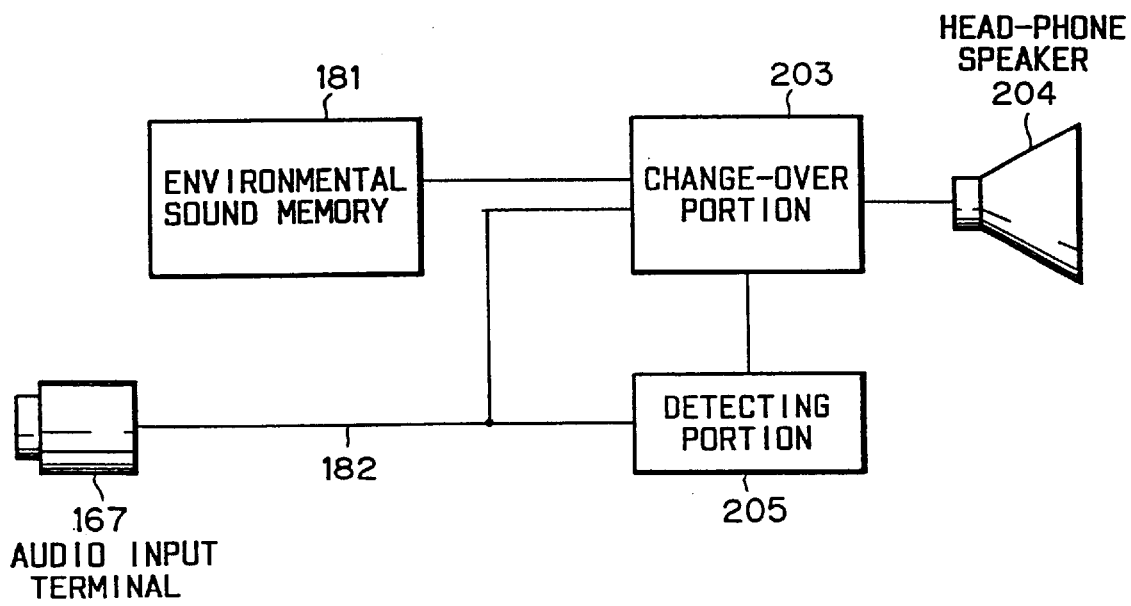
FIG. 20 is a block diagram of another exemplified structure of environmental sound presenting means used in a HMD device according to the present invention.

Referring to FIG. 20, another embodiment of an environmental sound presenting means which is a featured portion of the present invention. In FIG. 20, numeral 181 designates an environmental sound memory portion, 182 an audio-signal input circuit, 203 a sound change-over portion for changing-over the LCD sound 182 to the environmental sound 181 and vice versa, 204 a head-phone speaker, 205 a detecting portion for detecting the presence or absence of the LCD sound 182 and controlling the sound change-over portion 203. In practice, the detecting portion 205 controls the sound change-over portion 203 to output an audio-signal for the LCD when said signal exists or to output an environmental audio-signal selectively read from the environmental sound memory portion 181. This eliminates the necessity of limiting the frequency band of environmental audio-signals stored in the environmental sound memory portion 181.

Figure 21:
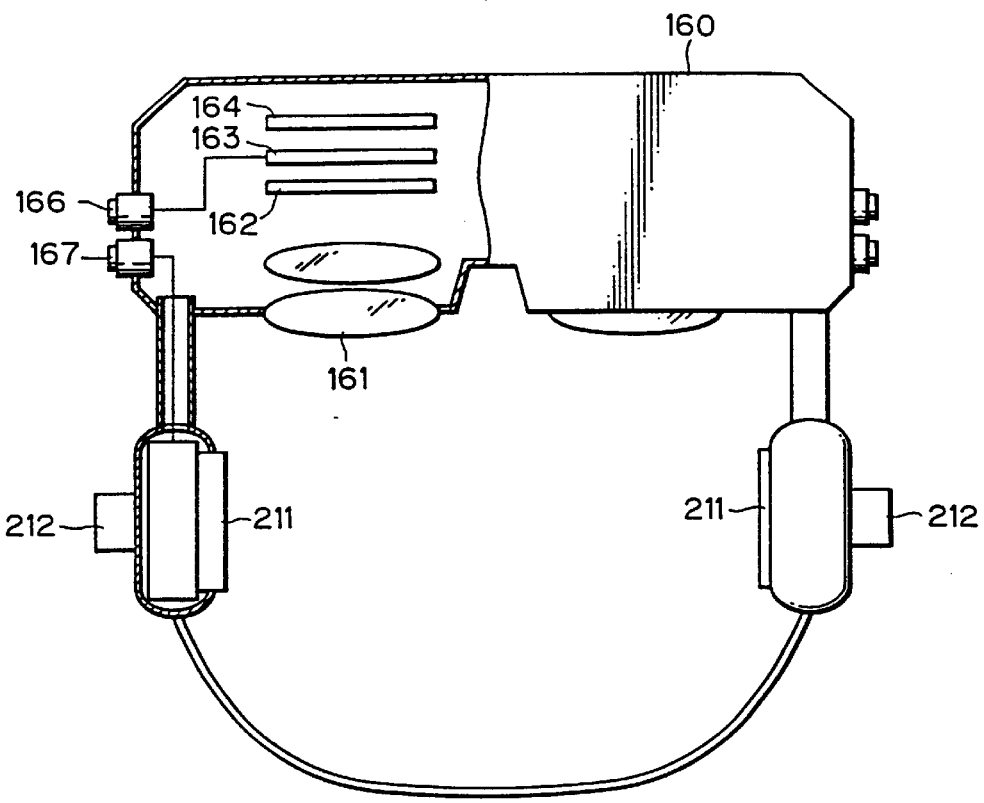
FIG. 21 is a schematic construction view of another HMD device embodying the present invention.
Figure 22:
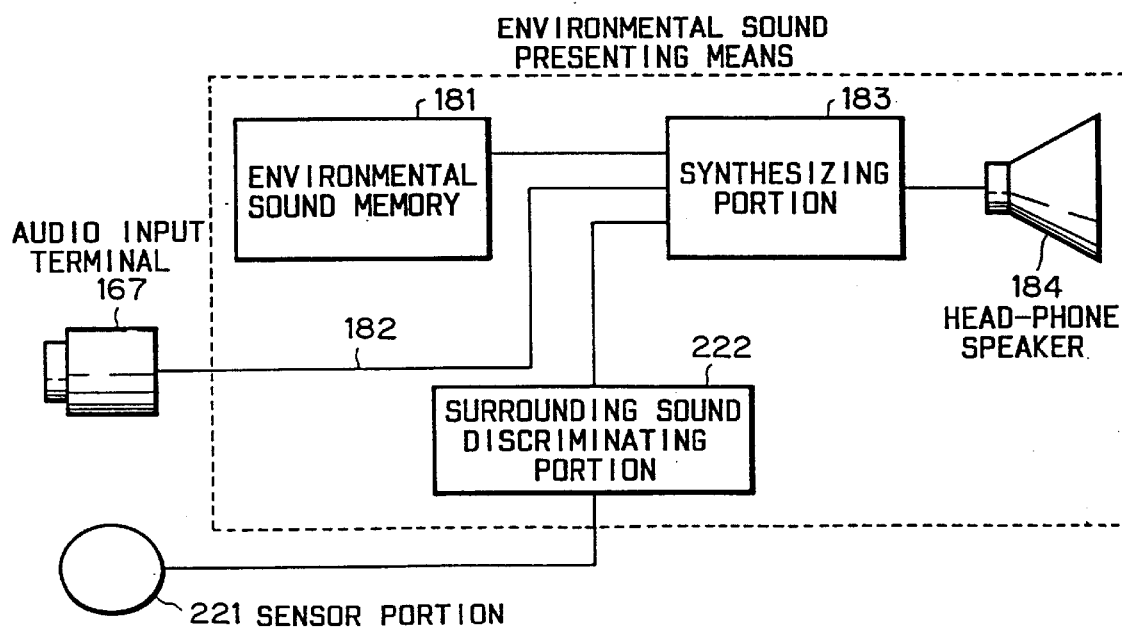
FIG. 22 is a block diagram of an exemplified structure of environmental sound presenting means used in another HMD device embodying the present invention.

Referring to FIGS. 21 and 22, another HMD device embodying the present invention will be described as follows:

In FIG. 21, numeral 161 designates an enlarging optical lens system, 162 an environmental image, 163 a liquid crystal display panel, 164 a back-light for the LCD panel, 166 a video input terminal and 167 an audio input terminal, 211 an environmental sound presenting means, 212 a sound sensor for detecting an external sound around the user of the HMD. The user puts the HMD on his head to view the LCD screen image with an environmental image through the lenses.

FIG. 22 is a block diagram showing an environmental sound presenting means 211 used in the shown embodiment. FIG. 22, numeral 181 designates an environmental sound memory portion, numeral 182 designates an audio-signal inputted from the outside, numeral 183 designates a synthesizing portion for mixing together an environmental sound, an LCD sound and a surrounding sound near the outside of the HMD device, numeral 184 designates a head-phone speaker and numeral 222 designates an outside-surrounding sound discriminating portion for discriminating a selectable outside sound through a sound sensor 221.

The outside-surrounding sound discriminating portion 222 determines whether an outside sound signal entered through the sound sensor 221 has an intensity equal to and higher than a certain level, e.g., 80 dB. No signal appears when the signal has a frequency lower than 80 dB. The signal having a frequency equal to or higher than 80 dB is transferred from the discriminating portion 222 to the synthesizing portion 183 wherein the surrounding sound, display sound and environmental sound are mixed together and then transferred to the head-phone speaker 184. In this instance, the synthesis is made under the following conditions:

Environmental sound intensity: 20 dB
Display sound intensity: 70 dB
Outside-surrounding sound intensity: 80 dB The above described intensity settings enable the outside-surrounding sound to be sensed by the user in both cases when the display sound and the environmental sound are presented and when the environmental sound is presented. The above described intensity settings of audio-signals are given by way of example and do not define the limits. It is, of course, possible to apply any other settings as far as the outside-surrounding sound is audible to the user.

As described above, the shown embodiment can provide the user with an audible outside sound through the head-phone speaker 184. This enables the user to hear, e.g., somebody speaking to him or a telephone is ringing. On the other hand, noises smaller than 80 dB are shut off, so the user can enjoy the audiovisual impression of a display image with an accompanying sound or an environmental image with an environmental sound.

As is apparent from the foregoing description, the image display devices according to the present invention offer the following advantages:

The first advantage is to reduce differential values of intensity and brightness between a main LCD image and an environmental image to the extent not to tire the eyes of a user by changing the light quantity and brightness of the environmental image according to the brightness of the LCD.

The second advantage is to protect the eyes of a user from being tired with an excessive change of perception by means of changing the light quantity and light quantity of an environmental image according to the brightness of external light.

The third advantage is to vary the brightness and color-tone of an environmental image in synchronism with a change of light quantity, brightness, color-tone and sound of the main display, thereby giving the main image with an increased impression of presence as compared with an image presented by a conventional HMD device.

The fourth advantage is to provide an environmental sound according to an environmental image, thereby attaining an increased interactive impression of audiovisual representation as compared with an image presented by a conventional HMD device.

The fifth advantage is to present a surrounding sound signal through which a user can recognize the surroundings.

What is claimed is:

1. An image display device for displaying a main image together with an environmental image disposed at periphery of the main image, the environmental image providing a background context for the main image, the image display device comprising:

a circumstance detector for detecting conditions external to the image display device under which a user uses the image display device; and environmental image-changing means for varying the environmental image according to external conditions detected by said circumstance detector.

2. An image display device as defined in claim 1 wherein a condition detected by the circumstance detector is a quantity or brightness of light around a user external to the image display device and the environmental image-changing means varies a light quantity of the environmental image to reduce a difference between the light quantity of the environmental image and the detected light quantity or brightness.

3. An image display device as defined in claim 1, wherein a condition detected by the circumstance detector is a volume of sound or sound around a user and the environmental image-changing means varies a light quantity of the environmental image according to the detected sound volume or sound.

4. An image display device as defined in claim 1, wherein a condition detected by the circumstance detector is a quantity or brightness of light around a user and the environmental image-changing means varies a color-tone of the environmental image according to the detected light quantity or brightness.

5. An image display device as defined in claim 1, wherein a condition detected by the circumstance detector is a volume of sound or sound around a user and the environmental image-changing means varies a color-tone of the environmental image according to the detected sound volume or sound.

6. An image display device for displaying a main image together with an environmental image disposed at periphery of the main image, the environmental image providing a background context for the main image, the image display device comprising:

a circumstance detector for detecting a quantity or brightness of light of the main image external to the environmental image under which a user uses the image display device; and environmental image-changing means for varying the environmental image according to detected light quantity or brightness of the main image detected by said circumstance detector.

7. An image display device as defined in claim 6, wherein the environmental image-changing means varies a light quantity of the environmental image to reduce a difference between the light quantity of the environmental image and the detected light quantity or brightness of the main image.

8. An image display device as defined in claim 6, wherein the environmental image-changing means varies a color-tone of the environmental image according to the detected light quantity or brightness.

9. An image display device for displaying a main image together with an environmental image disposed at periphery of the main image, the environmental image providing a background context for the main image, the image display device comprising:

a circumstance detector for detecting a sound volume or sound of the display device under which a user uses the image display device; and environmental image-changing means for varying the environmental image according to the sound volume or sound of the display device detected by said circumstance detector.

10. An image display device as defined in claim 9, wherein the environmental image-changing means varies a light quantity of the environmental image according to the detected sound volume or sound.

11. An image display device as defined in claim 9, wherein the sound volume or sound is associated with the main image.

12. An image display device as defined in claim 9, wherein the environmental image-changing means varies a color-tone of the environmental image according to the detected sound volume or sound.

13. An image display device as defined in claim 9, wherein the environmental image-changing means varies only the environmental image.

14. An image display device as defined in claim 6, wherein the environmental image-changing means varies only the environmental image.

15. An image display device as defined in claim 1, wherein the environmental image-changing means varies only the environmental image.

16. A method for displaying a main image together with an environmental image disposed at periphery of the main image, the environmental image providing a background context for the main image, comprising:

detecting conditions under which a user uses the image display device, said conditions being external to the environmental image; and varying the environmental image according to conditions detected by said circumstance detection.

17. The method as defined in claim 16, wherein the detecting includes sensing a quantity or brightness of light of the main image and the varying includes changing a light quantity of the environmental image to reduce a difference between the light quantity of the environmental image and the sensed light quantity or brightness.

18. The method as defined in claim 16, wherein the detecting includes sensing a sound volume or sound of the display device and the varying includes changing a light quantity of the environmental image according to the sensed sound volume or sound.

19. The method as defined in claim 18, wherein the sound volume or sound is associated with the main image.

20. The method as defined in claim 16, wherein the detecting includes sensing a quantity or brightness of light of the main image and the varying includes changing a color-tone of the environmental image according to the sensed light quantity or brightness.

21. The method as defined in claim 16, wherein the detecting a sound volume or sound of the display device and the varying includes changing a color-tone of the environmental image according to the sensed sound volume or sound.

22. The method as defined in claim 21, wherein the sound volume or sound is associated with the main image.

23. The method as defined in claim 16, wherein the varying varies only the environmental image.

24. The method as defined in claim 16, wherein the detecting includes sensing conditions external to the image display device.

25. The method as defined in claim 24, wherein the detecting includes sensing a quantity or brightness of light around a user external to the image display device and the varying includes changing a light quantity of the environmental image to reduce a difference between the light quantity of the environmental image and the sensed light quantity or brightness.

26. The method as defined in claim 24, wherein the detecting a sound volume or sound around a user and the varying includes changing a color-tone of the environmental image according to the sensed sound volume or sound.

27. The method as defined in claim 24, wherein the detecting includes sensing a quantity or brightness of light around a user and the varying includes changing a color-tone of the environmental image according to the sensed light quantity or brightness.

28. The method as defined in claim 24, wherein the detecting includes sensing a sound volume or sound around a user and the varying includes changing a color-tone of the environmental image according to the sensed sound volume or sound.

29. The method as defined in claim 16, wherein the varying varies only the environmental image.

* * * * *